US011072671B2

(12) United States Patent
Frey et al.

(10) Patent No.: US 11,072,671 B2
(45) Date of Patent: Jul. 27, 2021

(54) PROCESS FOR PRODUCING PTFE AND ARTICLES THEREOF

(75) Inventors: Oliver Frey, Gauting (DE); Klaus Hintzer, Kastl (DE); Wolfgang Neumann, Eichenring (DE); André Streiter, Muehldorf am Inn (DE)

(73) Assignee: 3M Innovative Properties Company, St. Paul, MN (US)

( * ) Notice: Subject to any disclaimer, the term of this patent is extended or adjusted under 35 U.S.C. 154(b) by 144 days.

(21) Appl. No.: 13/642,583

(22) PCT Filed: Apr. 28, 2011

(86) PCT No.: PCT/US2011/034224
§ 371 (c)(1),
(2), (4) Date: Oct. 22, 2012

(87) PCT Pub. No.: WO2011/139807
PCT Pub. Date: Nov. 10, 2011

(65) Prior Publication Data
US 2013/0040142 A1 Feb. 14, 2013

(30) Foreign Application Priority Data
Apr. 28, 2010 (GB) .................................... 1007043

(51) Int. Cl.
C08L 27/18 (2006.01)
C08F 214/26 (2006.01)
D01F 6/12 (2006.01)
C08F 2/24 (2006.01)

(52) U.S. Cl.
CPC ............ *C08F 214/262* (2013.01); *C08F 2/24* (2013.01); *D01F 6/12* (2013.01); *Y10T 428/2982* (2015.01)

(58) Field of Classification Search
None
See application file for complete search history.

(56) References Cited

U.S. PATENT DOCUMENTS

| 2,612,484 | A | | 9/1952 | Bankoff |
| 3,142,665 | A | | 7/1964 | Cardinal et al. |
| 3,819,594 | A | | 6/1974 | Holmes |
| 4,016,345 | A | | 4/1977 | Holmes |
| 4,391,940 | A | | 7/1983 | Kuhls et al. |
| 4,686,024 | A | | 8/1987 | Scherer et al. |
| 4,777,304 | A | | 10/1988 | Schweighardt et al. |
| 4,789,717 | A | * | 12/1988 | Giannetti et al. ............. 526/209 |
| 4,864,006 | A | | 9/1989 | Giannetti et al. |
| 4,895,990 | A | | 1/1990 | Sargent et al. |
| 4,990,283 | A | | 2/1991 | Visca et al. |
| 5,349,003 | A | * | 9/1994 | Kato et al. ................... 524/458 |
| 5,895,799 | A | | 4/1999 | Wu et al. |
| 6,037,399 | A | | 3/2000 | Wu et al. |
| 6,429,258 | B1 | | 8/2002 | Morgan et al. |
| 7,094,839 | B2 | | 8/2006 | Grootaert et al. |
| 7,125,941 | B2 | | 10/2006 | Kaulbach et al. |
| 8,404,790 | B2 | | 3/2013 | Hintzer et al. |
| 2002/0161149 | A1 | | 10/2002 | Kobayashi et al. |
| 2006/0003168 | A1 | | 1/2006 | Dadalas et al. |
| 2007/0004848 | A1 | * | 1/2007 | Hintzer et al. ............. 524/544 |
| 2007/0015937 | A1 | | 1/2007 | Hintzer et al. |
| 2007/0025902 | A1 | | 2/2007 | Hintzer et al. |
| 2008/0015304 | A1 | | 1/2008 | Hintzer et al. |
| 2008/0200571 | A1 | | 8/2008 | Higuchi et al. |
| 2008/0207859 | A1 | * | 8/2008 | Matsuoka et al. ............ 526/214 |

FOREIGN PATENT DOCUMENTS

| EP | 0 170 382 | 2/1986 |
| EP | 0 684 272 | 11/1995 |
| EP | 1 172 379 | 1/2002 |
| EP | 1 006 129 | 6/2002 |
| EP | 1245596 | 10/2002 |
| EP | 0 969 027 | 10/2003 |
| EP | 2 065 441 | 6/2009 |
| GB | 1281822 | 7/1972 |
| JP | 11-240918 | 9/1999 |
| WO | WO 97/03141 | 1/1997 |
| WO | WO 00/71590 | 11/2000 |
| WO | WO 2008/073251 | 6/2008 |
| WO | WO 2009/026123 | 2/2009 |
| WO | WO 2009/094346 | 7/2009 |

OTHER PUBLICATIONS

Apostolo, M., Biressi, G. "Microemulsion Polymerization for Producing Fluorinated Structured Materials." Macromol. Symp. 206 (2004): pp. 347-360.*
Harrison et al., "Polycyclic Fluoroaromatic Compounds—III Octafluoroacenaphthyleen, and Decafluoro-Indane, -Acenaphthene, -Anthracene, and -Pyrene", Tetrahedron, vol. 19, p. 1893-1901 (1963).
Chen et al., "Perfluoroalkylations and perfluorooxaalkylations, Part 2. Copper-mediated cross-coupling of secondary perfluorooxaalkyl iodides and aryl halides", Journal of Fluorine Chemistry vol. 65, p. 59-65 (1993).
Chen et al., "Formation and reactions of carbanions from α-substituted perfluoroacyl fluorides", Journal of Fluorine Chemistry vol. 55, p. 93-100 (1991).
Bernett et al., "Surface-Chemical Properties of Highly Fluorinated Compounds Containing Oxygen in the Aliphatic Chain", Journal of Physical Chemistry vol. 77, Issue 19, p. 2324-2328 (1973).
PCT International Search Report for PCT/US2011/034224, dated Feb. 8, 2012, 4 pages.

* cited by examiner

*Primary Examiner* — Scott R. Walshon
*Assistant Examiner* — Thomas A Mangohig
(74) *Attorney, Agent, or Firm* — Julie Lapos-Kuchar

(57) ABSTRACT

Described herein is a process for making PTFE having a standard specific gravity of less than 2.160 g/cm³ comprising: polymerizing a tetrafluoroethylene monomer in an aqueous medium comprising an emulsifier and an initiator in a reaction vessel and contacting the aqueous medium with a fluorinated polyether. Also described herein are the polymerizable compositions and articles thereof.

20 Claims, No Drawings

PROCESS FOR PRODUCING PTFE AND ARTICLES THEREOF

TECHNICAL FIELD

A process for producing polytetrafluoroethylene having a standard specific gravity of less than 2.160 g/cm$^3$, using a non-telogenic fluorinated polyether and polymerizable compositions and articles thereof is described.

BACKGROUND

Polytetrafluoroethylene (PTFE) has been widely used in coatings for its anti-stick properties and chemical resistance. The PTFEs for such applications have a high molecular weight. Such materials have a high melt viscosity and cannot be extruded by conventional extrusion equipment. Therefore, they have been named "non-melt processable". Non-melt processable PTFEs have a melt flow index of 0 when measured at 372° C. using a 10 kg load. Non-melt processible PTFEs used in coating applications tend to have a standard specific gravity (SSG) of around 2.17 g/cm$^3$ as measured according to ASTM 4895. The SSG is a measure for the molecular weight of the PTFE. The higher the SSG, the lower the molecular weight.

Non-melt processable PTFEs are also used in the preparation of breathable films or fibers, for example in the textile industry. To become breathable, the PTFE materials have to be microporous, which means that the pores are big enough to allow good gas transport, but small enough to prevent water from passing through. Favorable microporosity is achieved by stretching the PTFE material to multiple times its original size. The higher the molecular weight of the PTFE, the higher its stretchability. Therefore, for making PTFEs suitable for producing breathable films, ultra-high molecular weight PTFE is desired, such as, for example, PTFE that has an SSG of less than 2.160 g/cm$^3$.

Ultra-high molecular weight PTFE is prepared by emulsion polymerization. The resulting dispersion containing PTFE particles (so-called primary particles) finely dispersed in the polymerization medium (typically water) is then coagulated in a controlled way. The coagulated and agglomerated PTFE particles (secondary particles), also referred to herein as fine powder PTFE, are then dried and blended with a hydrocarbon liquid to form a paste. The paste is then extruded into sheets or fibers to form breathable films.

During emulsion polymerization of PTFE having ultra-high molecular weight, manufacturers typically wish to avoid unintentional and/or uncontrolled formation of coagulum, which is an agglomeration of the PTFE particles. The formation of coagulum is generally not desirable during polymerization. The coagulum can cause premature precipitation of the emulsion and floating coagulum can lead to hazardous conditions during the polymerization process. Furthermore, the coagulum can impact the mass transfer of the gaseous TFE monomer with the aqueous polymer emulsion during the polymerization, causing low consumption of TFE, which slows down the polymerization process and leads to long run times. The formation of a coagulum is particularly problematic in the preparation of ultra high molecular weight PTFE because the higher the molecular weight of the PTFE formed, the less shear-stable the PTFE dispersions are and the more susceptible they become to premature coagulation. Therefore, when polymerizing PTFE having an ultra-high molecular weight, there is a delicate balance to achieve the high molecular weight while avoiding unintentional coagulation of the emulsion.

Traditionally, manufacturers have modified the polymerization process of PTFE fine powder to reduce and/or control the formation of the coagulum. For example, U.S. Pat. No. 2,612,484 (Bankoff et al.) discloses adding a saturated hydrocarbon to efficiently stabilize the PTFE during polymerization against coagulation and permit thorough agitation of the emulsion in the reaction vessel. U.S. Publ. No. 2002/0161149 (Kobayashi et al.) discloses adding a stabilizing agent for PTFE polymerization, with paraffin wax being preferable, while U.S. Pat. No. 4,016,345 (Holmes) exemplifies adding paraffin wax to a horizontal kettle with a gentle agitation system during the polymerization of PTFE fine powders. In U.S. Pat. No. 4,391,940 (Kuhls, et al.) PTFE fine powders are manufactured using a core-shell technique and anticoagulants, such as longer-chain paraffin hydrocarbons, paraffin waxes and so-called white oils, are disclosed and said to may be used during polymerization.

SUMMARY

There is a desire to find alternative processes to control the formation of coagulum during the polymerization of PTFE with ultra-high molecular weight, which may enable reduced processing time and cost, and improved safety. There is also a desire to find alternative processes to decrease impurities (or contaminants) in the PTFE resulting from the anticoagulants that are added during polymerization.

In one aspect, a polymerizable composition for PTFE is provided comprising: an amount of water, a tetrafluoroethylene monomer; an emulsifier; an initiator; and a non-telogenic fluorinated polyether wherein the PTFE has a standard specific gravity of less than 2.160 g/cm$^3$.

In one embodiment, the non-telogenic fluorinated polyether is selected from at least one of $CHF_2CF_2CF_2OCF(CF_3)CF_2OCFHCF_3$, $CHF_2CF_2CF_2OCF(CF_3)CF(CF_3)OCF_2CF_2CHF_2$, $CF_3CF_2CF_2OCF(CF_3)CF(CF_3)OCF_2CF_2CF_3$, $CF_3(OCF(CF_3)CF_2)_n(OCF2)_mOCF_3$ wherein n and m are independently, within the range of 1 to 5, $CF_3CF_2CF_2O[CF(CF_3)CF_2O]_nCFXCF_3$ wherein X is selected from H, F or $CF_3$ and n is within the range of 2 to 8, $[C_3F_7O[CF(CF_3)CF_2O]_nCF(CF_3)—]_2$ wherein n is within the range of 1 to 3, $[C_3F_7OCF(CF_3)CF_2OCF(CF_3)CF_2OCF(CF_3)]_2$, $[C_3F_7OCF(CF_3)CF_2OCFHCF_2—]_2$, and including all isomers and combinations thereof.

In one aspect, a PTFE is provided made from a polymerizable composition comprising: an amount of water; a tetrafluoroethylene monomer; an emulsifier; an initiator; and a fluorinated polyether wherein the PTFE has a standard specific gravity of less than 2.160 g/cm$^3$.

In one aspect, a process for making PTFE is provided comprising: polymerizing a tetrafluoroethylene monomer in an aqueous medium comprising an emulsifier and an initiator in a reaction vessel; and contacting the aqueous medium with a fluorinated polyether, wherein the PTFE has a standard specific gravity of less than 2.160 g/cm$^3$.

In one aspect, a PTFE is provided made by the process comprising: polymerizing a tetrafluoroethylene monomer in an aqueous medium comprising an emulsifier and an initiator in a reaction vessel; and contacting the aqueous medium with a fluorinated polyether, wherein the PTFE has a standard specific gravity of less than 2.160 g/cm$^3$.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more; and

"and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.). Also herein, recitation of "at least one" includes all numbers of one and greater (e.g., at least 2, at least 4, at least 6, at least 8, at least 10, at least 25, at least 50, at least 100, etc.).

The PTFE of the present disclosure is a thermoplastic in that it can be remelted; however, because of its viscoelastic properties, the PTFE can generally not be processed by the traditional melt processing methods and therefore is sometimes referred to as non-melt processible. In general, this means that the melt viscosity of the PTFE is greater than $10^{10}$ Pascal-seconds. The PTFE of the present disclosure may have an MFI of 0 g/10 min at 380° C. and a load of 21.6 kg (according to ASTM D 1238-88). The PTFE of the present disclosure is typically highly crystalline. The PTFE has an ultra high molecular weight as expressed by an SSG density of less than 2.160 g/cm$^3$.

The present disclosure describes a process for producing PTFE having an SSG of less than 2.160 g/cm$^3$ wherein a fluorinated polyether is used to prevent and/or reduce the formation of coagulum during the aqueous emulsion polymerization.

The fluorinated polyether may not only impact the formation of coagulum, but may also act as a gas carrier, enabling improved mass transfer of the gaseous TFE monomers with the aqueous polymerization composition.

Suitable fluorinated polyethers are preferably selected such that they are non-telogenic (i.e., they do not have reactive groups that may polymerize into the polymer chain). Therefore, the fluorinated polyether preferably does not have reactive functional groups such as —COO$^-$, —OH, —NH$_2$, —CONH$_2$, —SO$_2$O$^-$. Typically, the fluorinated ethers do not have any functional groups other than the ether group(s). Further, the fluorinated polyether preferably does not comprise polymerizable terminal groups, such as, for example, —CF$_2$=CF$_2$ and the like. Preferably, the fluorinated polyethers do not interact with the actively growing polymer chain to generate radical species and/or terminate the polymer chain. Therefore, the fluorinated polyethers may be perfluorinated polyethers. In a particular embodiment the polyethers do not interact with the growing polymer chain to generate radical species and/or terminate the polymer chain at temperatures below 150° C. but may do so at temperatures above 250° C. Suitable polyethers of this kind typically contain one or more, preferably one, hydrogen atom, i.e. they are partially fluorinated polyethers.

In the present disclosure, the fluorinated polyether is preferably not miscible with water. In other words the fluorinated polyether has a solubility in water of less than 1, 0.5, 0.25, 0.1, 0.05, 0.025, or even 0.01% by weight (in distilled water at ambient conditions (25° C., 1 bar).

Suitable fluorinated polyethers include those having the general formula:

  (I)

wherein $R_{f1}$, $R_{f2}$, and $R_{f3}$ may be identical or different and may be linear or branched, partially or fully fluorinated alkylene groups. Optionally, $R_{f1}$, $R_{f2}$, and/or $R_{f3}$ may comprise catenary oxygen atoms (i.e., additional ether linkages). The fluorinated polyether of the present disclosure has at least 2, 3, 4, 5, 6, 7, 8, 9, or even 10 ether oxygen atoms. The fluorinated polyether optionally, may comprise other heteroatoms, such as, for example, nitrogen or sulfur.

In one embodiment, $R_{f1}$ is a linear alkyl group comprising 2 to 3 carbon atoms; $R_{f2}$ is a linear or branched alkylene group comprising 2 to 6 carbon atoms; and $R_{f3}$ is an alkyl group comprising 0 to 6 catenary oxygen atoms and wherein the alkyl and the alkylene group(s) comprises linear and/or branched alkylene groups.

In one embodiment, the fluorinated polyether is a perfluorinated ether having the general formula (II):

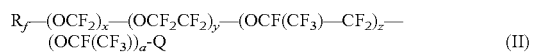  (II)

wherein $R_f$ is selected from perfluoroalkyl groups having from 1 to 10 carbon atoms; Q is selected from $R_f$ or $R'_f$—(OCF$_2$)$_x$—(OCF$_2$CF$_2$)$_y$—(OCF(CF$_3$)—CF$_2$)$_z$—(OCF(CF$_3$))$_a$ wherein $R'_f$ may be selected from a perfluorinated alkyl group having 1 to 10 carbon atoms, $R'_f$ may be the same or different than $R_f$; and wherein each x, y, z, and a is independently selected from 0 to 10, with the proviso that the sum of x+y+z+a is at least 1.

In another embodiment, the fluorinated polyether is a partially fluorinated liquid selected from the fluorinated ethers of the general formula (III):

  (III)

wherein $R_f$ is selected from a perfluorinated alkyl group having from 1 to 4 carbon atoms, and n is from 1 to 10.

In another embodiment, the fluorinated polyether is a partially fluorinated liquid selected from the fluorinated ethers of the general formula (IV):

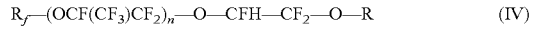  (IV)

wherein $R_f$ may be selected from a perfluorinated alkyl group having from 1 to 10 carbon atoms, R may be selected from a partially or fully fluorinated alkyl group having from 1 to 10 carbon atoms. R may be the same or different than $R_f$ and n is from 1 to 8.

In yet another embodiment, the fluorinated polyether comprises a derivative of hexafluoropropylene oxide, having, at least 1 repeating unit of —[(CF$_3$)CFCF$_2$O]—.

Exemplary suitable fluorinated polyethers include, but are not limited to, CHF$_2$CF$_2$CF$_2$OCF(CF$_3$)CF$_2$OCFHCF$_3$; CHF$_2$CF$_2$CF$_2$OCF(CF$_3$)CF(CF$_3$)OCF$_2$CF$_2$CHF$_2$; CF$_3$CF$_2$CF$_2$OCF(CF$_3$)CF(CF$_3$)OCF$_2$CF$_2$CF$_3$; CF$_3$(OCF(CF$_3$)CF$_2$)$_n$(OCF$_2$)$_m$OCF$_3$ wherein n and m are independently 1, 2, 3, 4, 5, 6, 7, 8, 9, or 10 (such as the polyethers available under the trade designation "GALDEN" from Solvay Solexis S.p.A., Bollate, Italy); CF$_3$CF$_2$CF$_2$O[CF(CF$_3$)CF$_2$O]$_n$CFXCF$_3$ wherein X is H, F, or CF$_3$ and n is 2, 3, 4, 5, 6, 7, 8, 9, or 10; (C$_3$F$_7$O[CF(CF$_3$)CF$_2$O]$_n$CF(CF$_3$)—)$_2$ wherein n is 1, 2, 3, 4, or 5; (C$_3$F$_7$OCF(CF$_3$)CF$_2$OCF(CF$_3$)CF$_2$OCF(CF$_3$)—)$_2$; (C$_3$F$_7$OCF(CF$_3$)CF$_2$OCFHCF$_2$—)$_2$; C$_3$F$_7$OCFCF$_3$CF$_2$OCHFCF$_2$OCH$_2$CF$_3$; and F(CF$_2$CF$_2$CF$_2$O)$_n$CF$_2$CF$_3$ wherein n is at least 2 (such as the perfluoropolyethers available under the trade designation "DEMNUM" from Daikin Industries, LTD., Osaka, Japan); F(CF(CF$_3$)CF$_2$O)$_n$CF$_2$CF$_3$ wherein n is at least 2 (such as the perfluoropolyethers available under the trade designation "KRYTOX" from DuPont de Nemours Inc., Wilmington, Del., USA), and including all isomers and combinations thereof. The fluorinated polyethers identified by their chemical formulae hereinabove are considered non-telogenic. The preparation of various non-telogenic fluorinated polyethers has been described, for example in German Pat. Appl. No. DE 2 000 830 (Bristol et al.), and U.S. Pat. No. 4,777,304 (Schweighardt et al.), U.S. Pat. No. 4,895,990 (Sargent et al.) and U.S. Pat. No. 4,686,024 (Sherer et al.); and in the following journals: Tetrahedron, 19, 1893 (1963); Journal of Fluorine Chemistry 65, 59 (1993); Journal of Fluorine Chemistry 55, 93 (1991); and Journal of Physical Chemistry 77, 2324 (1973). Nontelogenic fluorinated polyethers are also commercially available, for example, from 3M Co., St. Paul, Minn., USA; Hoechst GmbH, Frankfurt, Germany; Solvay Solexis S.p.A., Bollate, Italy; Anles Ltd., St. Petersburg, Russia; Daikin Industries Ltd, Osaka, Japan; and DuPont de Nemours Inc., Wilmington, Del., USA.

Without wishing to be bound by theory and without admitting that such is the case, it is believed that during polymerization, the coagulum formed can agglomerate and float on the aqueous surface of the polymerization media, despite the coagulum having a density of more than 2 g/cm$^3$. During the polymerization, this floating coagulate is believed to be exposed to an elevated TFE concentration in the gas phase, which may cause the polymerization speed to accelerate at the polymer-monomer interface. Concurrently, the cooling at the surface may be decreased due to the lack of heat transfer fluid (water). It is believed that these combined effects may lead the generation of hot spots in the reaction vessel and to a heating of the coagulate above the ignition temperature of TFE, which is approximately 300° C.

In one embodiment, a partially fluorinated polyether may be preferred. One attribute of TFE polymerization is that the polymer chain radicals can not terminate themselves because there is no chain transfer of the polymer in which a fluorine atom separates in order to form a terminal double bond. Consequently, the heat-generating radicals are fixed in place within the coagulate surfaces. It is believed that partially fluorinated polyethers wet the coagulum formed during polymerization, and may terminate the fluorinated heat-generating radicals by means of a radical transfer reaction, which means these "hot spots" may be tamed. The partially fluorinated polyethers may be capable of quickly carry away the locus of polymerization from the floating coagulum via radical transfer. That further means, the partially fluorinated polyether may act as a chain transfer agent but only at very high temperatures, e.g. >250° C.

In another embodiment, the polymerization of PTFE comprises a partially fluorinated polyether, in particular those described above, used in combination with a partially fluorinated emulsifier, in particular a partially fluorinated emulsifier as described below. The use of partially fluorinated emulsifiers in combination with the fluorinated polyether, in particular partially fluorinated polyethers, may advantageously quickly carrying away the locus (or center) of polymerization from the floating coagulum.

In one embodiment, the fluorinated polyether has a molecular weight of less than 2000, 1500, 1000, 750, or even 500 grams/mole.

Typically, the fluorinated polyether is selected to have a boiling point of at least 100° C., 150° C., or even 200° C.; at most 175° C., 200° C., 225° C., 250° C., 275° C., 300° C., 325° C., or even 350° C.

Typically the fluorinated polyether may be added undiluted (i.e., in pure form) into the reaction vessel in amount of at least 0.1, 0.2, 0.3, 0.5, 0.75, 1.0, 1.1, 1.2, 1.5, 2, 5, 10, 15, or even 20% by weight versus the amount of water used in the aqueous emulsion polymerization.

The fluorinated polyether may be added to the reaction vessel prior to and/or during the polymerization. Generally, the fluorinated polyether may not be added as a microemulsion nor may it be added as preemulsion with small droplet sizes, such as those disclosed in EP Pat. No. 1245596 (Kaulbach et al.).

In the present disclosure, TFE (tetrafluoroethylene) is polymerized in an aqueous emulsion. The aqueous emulsion polymerization can be carried out by using TFE alone or TFE together with a comonomer, in an aqueous medium containing an emulsifier and a polymerization initiator.

The PTFE of the present disclosure may be a homopolymer of TFE, or a copolymer of TFE (i.e., comprising interpolymerized monomeric units of TFE and at least one or more kinds of additional fluorinated monomers, referred to herein as fluorinated comonomers). The fluorinated comonomers used to prepare the PTFE should generally be kept low enough so as not to impair the overall non-melt processible characteristics of the PTFE. Accordingly, the total amount of the additional fluorinated comonomer(s) should typically not exceed 1%, 0.75%, or even 0.5% by weight based on the total weight of the PTFE.

The fluorinated comonomers include those having an ethylenically unsaturated group other than TFE, for example, a fluorinated $C_3$ to $C_8$ olefin, a fluorinated vinyl ether, or a fluorinated vinyl alcoxy ether. Exemplary fluorinated comonomer include: fluorinated $C_3$ to $C_8$ olefin such as hexafluoropropylene, perfluorobutene-1, perfluorohexane-1, perfluorononane-1, (perfluoromethyl)ethylene, (perfluorobutyl)ethylene, vinylidene fluoride, and chlorotrifluoroethylene; perfluorovinyl ethers such as perfluoro(methyl vinyl ether), perfluoro(ethyl vinyl ether), perfluoro (propyl vinyl ether), and perfluoro(heptyl vinyl ether); perfluorovinyl alcoxy ethers, such as perfluoro-2-propoxypropyl vinyl ether, perfluoro-2-methoxy-ethylvinyl ether, and perfluoro-3-methoxy-1-propylvinyl ether; and combinations thereof.

When used, an emulsifier is typically used in amount of 0.01% by weight to 1% by weight. Suitable emulsifiers include any fluorinated emulsifier commonly employed in aqueous emulsion polymerization. Particularly preferred emulsifiers are those that correspond to the general formula:

$$Y-R_f-Z-M \quad (V)$$

wherein Y represents hydrogen, Cl or F; $R_f$ represents a linear or branched perfluorinated alkylene having 4 to 10 carbon atoms; Z represents COO$^-$ or SO$_3^-$ and M represents an alkali metal ion or an ammonium ion. Exemplary emulsifiers include: ammonium salts of perfluorinated alkanoic acids, such as perfluorooctanoic acid and perfluorooctane sulphonic acid.

Also contemplated for use in the preparation of the polymers described herein are emulsifiers of the general formula:

$$[R_f-O-L-COO^-]_i X_i^+ \quad (VI)$$

wherein L represents a linear partially or fully fluorinated alkylene group or an aliphatic hydrocarbon group, $R_f$ represents a linear partially or fully fluorinated aliphatic group or a linear partially or fully fluorinated group interrupted with one or more oxygen atoms, $X_i^+$ represents a cation having the valence i and i is 1, 2 and 3. In case the emulsifier contains partially fluorinated aliphatic group it is referred to as a partially fluorinated emulsifier. Specific examples are described in, for example, US Pat. Publ. 2007/0015937

(Hintzer et al.). Exemplary emulsifiers include: $CF_3CF_2OCF_2CF_2OCF_2COOH$, $CHF_2(CF_2)_5COOH$, $CF_3(CF_2)_6COOH$, $CF_3O(CF_2)_3OCF(CF_3)COOH$, $CF_3CF_2CH_2OCF_2CH_2OCF_2COOH$, $CF_3O(CF_2)_3OCHFCF_2COOH$, $CF_3O(CF_2)_3OCF_2COOH$, $CF_3(CF_2)_3(CH_2CF_2)_2CF_2CF_2CF_2COOH$, $CF_3(CF_2)_2CH_2(CF_2)_2COOH$, $CF_3(CF_2)_2COOH$, $CF_3(CF_2)_2(OCF(CF_3)CF_2)OCF(CF_3)COOH$, $CF_3(CF_2)_2(OCF_2CF_2)_4OCF(CF_3)COOH$, $CF_3CF_2O(CF_2CF_2O)_3CF_2COOH$, and their salts. In one embodiment, the molecular weight of the emulsifier, preferably a partially fluorinated emulsifier, is less than 1500, 1000, or even 500 grams/mole.

These emulsifiers may be used alone or in combination as a mixture of two or more of them. The amount of the emulsifier is well below the critical micelle concentration, generally within a range of from 250 to 5,000 ppm (parts per million), preferably 250 to 2000 ppm, more preferably 300 to 1000 ppm, based on the mass of water to be used. Within this range, the stability of the aqueous emulsion should be improved. In order to further improve the stability of the aqueous emulsion, it may be preferred to add an emulsifier during the polymerization.

In one embodiment, the emulsifier is not added simultaneously (i.e., is added separately) with the fluorinated polyether to the reaction vessel.

In one embodiment, the emulsifier is added as a microemulsion with a fluorinated liquid, such as described in U.S. Publ. No. 2008/0015304 (Hintzer et al.), WO Publ. No. 2008/073251 (Hintzer et al.), and EP Pat. No. 1245596 (Kaulbach et al.). Microemulsions are transparent emulsions that are thermodynamically stable (indefinitely stable) and have droplet sizes from 10 nm to a maximum of 100 nm. Large quantities of fluorinated emulsifiers are used to prepare these microemulsions. In the cases where a mixture is used that is not a microemulsion, the particle sizes and amounts of the ingredients are such that the emulsion or mixture formed is not transparent, but is milky or opaque.

In one embodiment, the emulsifier is not added as a microemulsion with a fluorinated liquid.

Typically, the fluorinated polyether is added in excess of the emulsifer. In one embodiment, the weight ratio of the fluorinated polyether to emulsifier is greater than 1:1, 1.5:1, 2:1, 2.5:1, 3:1, 5:1, or even 10:1.

The aqueous emulsion polymerization may be initiated with a free radical initiator or a redox-type initiator. Any of the known or suitable initiators for initiating an aqueous emulsion polymerization of TFE can be used. Suitable initiators include organic as well as inorganic initiators, although the latter are generally preferred. Exemplary organic initiators include: organic peroxide such as bissuccinic acid peroxide, bisglutaric acid peroxide, or tert-butyl hydroperoxide. Exemplary inorganic initiators include: ammonium-alkali- or earth alkali salts of persulfates, permanganic or manganic acids, with potassium permanganate preferred. A persulfate initiator, e.g. ammonium persulfate (APS), may be used on its own or may be used in combination with a reducing agent. Suitable reducing agents include bisulfites such as for example ammonium bisulfite or sodium metabisulfite, thiosulfates such as for example ammonium, potassium or sodium thiosulfate, hydrazines, azodicarboxylates and azodicarboxyldiamide (ADA). Further reducing agents that may be used include sodium formaldehyde sulfoxylate or fluoroalkyl sulfinates. The reducing agent typically reduces the half-life time of the persulfate initiator. Additionally, a metal salt catalyst such as for example copper, iron, or silver salts may be added.

The amount of the polymerization initiator may suitably be selected, but it is usually preferably from 2 to 600 ppm, based on the mass of water. The amount of the polymerization initiator is preferably small, since the smaller the amount of the polymerization initiator, the smaller the standard specific gravity of the obtainable PTFE, i.e. the larger the average molecular weight of the obtainable PTFE. Further, if the amount of the polymerization initiator is too small, the polymerization rate tends to be slow, and if it is too much, the SSG of the resulting PTFE tends to be high.

The aqueous emulsion polymerization system may further comprise auxiliaries, such as buffers, and complex-formers. It is preferred to keep the amount of buffers and ions as low as possible to ensure a higher colloidal stability of the PTFE latex.

In one embodiment, the polymerization is initiated with TFE monomers and optionally other comonomers to form the ultra-high molecular weight PTFE.

In another embodiment, a seeded polymerization may be used to produce the ultra-high molecular weight PTFE. That is, the polymerization is initiated in the presence of small particles of fluoropolymer, typically small PTFE particles that have been homopolymerized with TFE or produced by copolymerizing TFE with a partially fluorinated or perfluorinated comonomer. These seed particles typically have a volume average diameter of between 50 and 100 nm (nanometers). Such seed particles may be produced in a separate aqueous emulsion polymerization and may be used in an amount of 20 to 50% by weight based on the weight of water in the aqueous emulsion polymerization. In one exemplary embodiment, the PTFE of the present disclosure is obtained using a seed polymerization, followed by polymerization with TFE and during the final stage of the polymerization, a partially fluorinated or non-fluorinated comonomer is added with the TFE. Accordingly, the thus produced PTFE particles will comprise a core of a homopolymer of TFE or a copolymer of TFE, an intermediate shell of homopolymer of TFE and an outer shell comprising either a homopolymer of PTFE, or a copolymer of TFE and partially fluorinated or non-fluorinated comonomer. In either case, the outer shell of the resulting PTFE particles of the present disclosure comprise a PTFE with an ultra-high molecular weight and achieves a SSG of the final PTFE of less than 2.160 $g/cm^3$. The use of seed particles allows better control over the resulting PTFE particle size and the ability to vary the amount of TFE in the core or shell. Such polymerization of PTFE using seed particles is described, for example, in U.S. Pat. No. 4,391,940 (Kuhls et al.). In another embodiment, core shell particles are contemplated which may comprise a core of a homopolymer of TFE or a copolymer of TFE, and at least one shell comprising either a homopolymer of PTFE, or a copolymer of TFE and partially fluorinated or non-fluorinated comonomer, wherein the at least one outer shell has a molecular weight that is lower than that of the core. Again the polymer has a final SSG as described herein. The core shell structure described above may further increase the resistance of the polymer to coagulation.

The aqueous emulsion polymerization, whether done with or without seed particles, will preferably be conducted at a temperature of at least 10° C., 25° C., 50° C., 75° C., or even 100° C.; at most 70° C., 80° C., 90° C., 100° C., 110° C., 120° C., or even 150° C. The polymerization will preferably be conducted at a pressure of at least 0.5, 1.0, 1.5, 1.75, 2.0, or even 2.5 MPa (megaPascals); at most 2.25, 2.5, 3.0, 3.5, 3.75, 4.0, or even 4.5 MPa.

Usually the aqueous emulsion polymerization for ultra-high molecular weight PTFE is carried out usually by mildly stirring the aqueous polymerization mixture. The stirring conditions are controlled so that the fine particles of PTFE formed in the aqueous dispersion will not coagulate.

Because ultra-high molecular weight PTFE aqueous emulsions are especially sensitive to coagulum formation, manufacturers typically employ gentle agitation, such as those found in horizontal kettles. Advantageously, the aqueous emulsion of the present disclosure may be polymerized in a vertical kettle (or autoclave). Vertical kettles usually have higher shear rates during agitation than horizontal kettle with paddle agitators. Consequently, vertical kettles are traditionally not used in ultra-high molecular weight PTFE polymerization due to the higher risk of coagulation. As shown in the examples, the use of a fluorinated polyether as described above may overcome the premature coagulation of the PTFE, allowing the polymerization to occur in vertical kettles, which traditionally offer improved safety over horizontal kettles.

The aqueous emulsion polymerization usually is carried out until the concentration of the fine particles of PTFE in the aqueous emulsion is at least 15, 20, 25, or even 30% by weight; at most 20, 30, 35, 40, or even 50% by weight.

In the PTFE latex (i.e., the PTFE dispersion), the average particle size of the PTFE particles (i.e., primary particles) is at least 150, 200, or even 250 nm; at most 250, 275, 300, or even 350 nm (volume average). The particle sizes of dispersions can be determined by inelastic light scattering (for example using a Malvern 100 HAS Zetasizer), for example according to DIN ISO 13321 1996(E). The PTFE latex can also be used to prepare monomodal, bimodal, and multimodal particle size distributions. These distributions may have a wide distribution, such as, for example, particle sizes ranging from 20 nm to 1000 nm.

Because the formation of the coagulum is controlled, higher TFE uptake rates are observed even at the end of the polymerization, resulting in shorter polymerization times. In one embodiment of the present disclosure, the quotient of the gross reaction rate ($v_{Br}$) and the volume of the reaction phase ($V_{rp}$) at the end of the polymerization is at least 27, 35, 40, 45, 50, 55, 60, 65, 70, 80 or even 90 kg/(m$^3$ hr) (kilograms/(hour·cubic meter)). In this calculation, the amount of TFE consumed at the end of polymerization is normalized versus the amount of water used in the polymerization to make the quotient independent of kettle size. The higher the quotient value, the more TFE is being used at the end of the polymerization, indicating an efficient polymerization process. An efficient polymerization process means that shorter polymerization times may be used. In one embodiment of the present disclosure, polymerization times are less than 180, 170, 160, 150, 140, 130, 120, or even 100 minutes to achieve solid contents higher than 15% by weight. In one embodiment the solid contents in the resulting PTFE polymerization are higher then 16%, 17% or even 18% by weight as determined according to DIN EN ISO 12086.

The polymerization degree is a calculated value based on the moles of PTFE produced divided by the moles of initiator used. The value may be used to approximate molecular weight. The PTFE of the present disclosure have a polymerization degree $P_n$ of at least 200,000; 500,000; 700,000; 800,000; 1,000,000; 1,250,000; or even 1,500,000. The high degree of polymerization can be achieved due to the stabilization of the emulsion by the non-telogenic fluorinated polyether and the higher polymerization rates.

After polymerization, the fluorinated polyether can be recovered from the process by phase separation. In one embodiment, the fluorinated polyether is more dense than water, allowing for the fluorinated polyether to be emptied from the bottom of the reaction vessel.

After the conclusion of the polymerization reaction, the PTFE may then be deliberately coagulated from the aqueous emulsion and dried. In one embodiment, the aqueous emulsion is stirred at high shear rates to deliberately coagulate the PTFE. In another embodiment, a coagulating agent, such as for example, an ammonium carbonate, a polyvalent organic salt, a mineral acids, a cationic emulsifier or an alcohol, is added to the aqueous emulsion to deliberately coagulate the PTFE.

Drying of the PTFE obtained by the deliberate coagulation of the aqueous emulsion can be carried out at an optional temperature, such as for example, drying within a range of from 100° C. to 300° C. By drying, PTFE of the present disclosure can be obtained. The coagulated and dried PTFE (i.e., secondary particles) according to the present disclosure has an average particle size (number average) of greater than 150, 250, 300, 400, 500, 1000, or even 1500 μm (micrometers). Particle sizes of coagulated particles can be determined by electron microscopy. The average particle sizes can be expressed as number average by standard particle size determination software.

PTFE of the present disclosure has high stretchability. The PTFE typically has a fibrillatable character. The PTFE is of a non-melt fabricable quality. Further, PTFE of the present disclosure has a standard specific gravity and may have an endothermic ratio, which are within specific ranges.

The standard specific gravity (hereinafter referred to as SSG, with the unit: g/cm$^3$) of the PTFE of the present disclosure, is at most 2.185, 2.180, 2.170, 2.160, 2.157, 2.150, or even 2.145 as measured according to ASTM D4895-04. SSG is an index of average molecular weight. SSG of the PTFE of the present disclosure has a very small value, thus indicating a high average molecular weight. SSG tends to decrease as the average molecular weight increases. Namely, with PTFE of the present disclosure, the value of SSG is small, and accordingly, it is expected that its average molecular weight is considerably high.

The endothermic ratio (described in U.S. Pat. No. 2002/0161149 (Kobayashi et al.) of the PTFE of the present disclosure is at most 0.15, 0.13, 0.10, or even 0.08. This endothermic ratio is defined by the DSC-measurement of an endothermic ratio, as will be described hereinafter. Usually, in the crystal fusion behavior by a differential thermal analysis of PTFE, a plurality of peaks are observed, which indicates that there are a corresponding number of differences in the crystal structure, etc. In the stretching operation, the structure is preferably substantially uniform as much as possible, so that uniform stretching can be carried out, and a porous material thereby obtainable will have excellent properties. The endothermic ratio is an index to show the uniformity of the structure, and the smaller the endothermic ratio, the smaller the irregularity in the structure in the PTFE. If the endothermic ratio exceeds 0.15, stretching at a high stretching ratio tends to be difficult.

Conventional ultra-high molecular weight PTFE has a high melt viscosity and does not easily flow at the melting temperature, and thus, it has a non-melt fabricable quality. Accordingly, this PTFE is usually subjected to paste extruded molding, wherein the PTFE is blended with a lubricant, molded by extrusion, then the lubricant is removed, and the extruded product thereby obtained is usually fused (sintered) at a temperature higher than the melting point of the PTFE and/or formed into the shape of a final product.

In one embodiment, the PTFE of the present disclosure has an extrusion pressure at reduction ratio of 100 (according to DIN EN ISO 12086) of less than 40 MPa, 30 MPa, 25 MPa, 20 MPa, or even 15 MPa; and/or more than 5 MPa, 7 MPa, or even 10 MPa.

The PTFE of the present disclosure has high stretchability, measured, for example, by its elongation at break. The PTFE may have an elongation at break of greater than 700%. Elongation at break may be measured on tensile testers. Typically, 100 µm thick films may be subjected to 50 mm elongation per minute at ambient conditions (25° C.). The time and pressure at which the sample breaks are recorded. The PTFE may have a fibrillated character, and a non-melt-fabricable quality. These properties are properties that are usually required for paste extruded molding.

Important products obtainable from ultra-high molecular weight PTFE may be fibers, sheets, or air permeable cloth materials for products such as garments, clothes, tents, membranes for separation, etc. Such products can be obtained by rapidly stretching an extruded product obtained by paste extruded molding of the PTFE in an unsintered state, to impart a nature to let steam permeate, but not to let condensed water permeate.

Traditionally manufacturers polymerize ultra-high molecular weight PTFE in the presence of anticoagulants typically saturated hydrocarbons, such as waxes and/or oils, to control premature coagulation formation. These waxes and/or oils are removed, but even trace amounts in the finished products, may cause weak points or failure (i.e., breakage) in the finished product, or discoloration during high sintering temperatures (such as greater than 350° C.), which is undesirable. Such waxes or oils are hydrocarbons of the general formula CnH2n+2 wherein n is from 20 up to 40. In the present disclosure, fluorinated polyethers are used to control premature coagulation formation during the PTFE polymerization. Because the non-telogenic fluorinated polyethers are synthetic materials, they typically comprise few, if any, impurities, resulting in a cleaner end product (i.e., ultra-high molecular weight PTFE). Thus, in one embodiment, the PTFE of the present disclosure is essentially free of alkane hydrocarbons having at least 20, 25, 30, or even 40 carbon atoms. Essentially free of alkane hydrocarbons means less than 1000 ppm, 100 ppm, 10 ppm or even less than 1 ppm of alkane hydrocarbons of the formula CnH2n+2 with n being an integer of 20 to 40 are present. This can be determined, for example, by solid state NMR or by gaschromatography using an external standard for the hydrocarbon. Additionally, the PTFE of the present disclosure after deliberate coagulation and drying, may comprise a low amount of the fluorinated polyether(s), typically less than 100 ppm, 50 ppm, 10 ppm or even less than 1 ppm.

EXAMPLES

Advantages and embodiments of this disclosure are further illustrated by the following examples, but the particular materials and amounts thereof recited in these examples, as well as other conditions and details, should not be construed to unduly limit this disclosure. In these examples, all percentages, proportions and ratios are by weight unless otherwise indicated.

All materials are commercially available, for example from Sigma-Aldrich Chemie GmbH; Steinheim, Germany, or Merck KGaA, Darmstadt, Germany, or known to those skilled in the art unless otherwise stated or apparent.

These abbreviations are used in the following examples: g=gram, hr=hour, kg=kilograms, m=meter, min=minutes, mol=mole, cm=centimeter, mm=millimeter, ml=milliliter, L=liter, psi=pressure per square inch, MPa=megaPascals, and wt=weight.

Process A

A 40-L vertical kettle equipped with an anchor agitator and baffle, was charged with approximately 23.5 L of deionized water and 3.7 kg of a 10% by weight solution of a seed latex comprising TFE and having an average particle $D_{50}$ size of 90 nm and then heated to 30° C. The seed latex, comprising TFE and 0.3% hexafluoropropylene was prepared according to U.S. Pat. No. 4,391,940 (Kuhls et al.) using a 30% solution of emulsifier. The 30% solution of emulsifier was an aqueous solution that comprised 30% by weight of a fluorinated polyether carboxylic acid emulsifier ($CF_3O(CF_2)_3OCHFCF_2C(O)ONH_4$, prepared as described in U.S. Pat. No. 7,671,112 (Hintzer et al.) as Compound II) and 1.9% by weight of a perfluorinated tertiary amine (sold under the trade designation "3M FLUORINERT ELECTRONIC FLUID FC-70" by 3M Co., St. Paul, Minn.). The kettle was evacuated repeatedly to remove oxygen and the agitation speed was set to 115 revolutions per minute (rpm). About 80 g of the 30% solution of emulsifier described above (about 24 g of the fluorinated polyether carboxylic acid emulsifier) was added to the oxygen free kettle. Then 1.31 g of oxalic acid×2 $H_2O$ was added, followed by the non-telogenic fluorinated polyether. The kettle then was pressurized with tetrafluoroethylene (TFE) monomer to 1.5 MPa. In the first 45 minutes of the reaction, an aqueous solution of potassium permanganate (initiator) was pumped into the reactor.

A pressure drop indicated the start of the polymerization reaction. Between 5 to 7 kg of TFE were continuously fed to the polymerization such that the required polymerization pressure was maintained. After the desired amount of TFE had been fed, the polymerization reaction was stopped by shutting the monomer valve and releasing the pressure.

After polymerization of the PTFE, the PTFE latex comprised PTFE particles (i.e., primary particles) in an aqueous solution. The PTFE latex was deliberately coagulated and dried as follows. The PTFE latex (1000 mL) was diluted with deionized water (1000 mL) and coagulated by adding 418 mg of oxalic acid×2 $H_2O$ under vigorous agitation. The coagulated PTFE was washed with 3 L deionized water and then dried at 175° C. for 12 hours to obtain the secondary particles PTFE (i.e., fine powder PTFE).

Process B

A 40-L vertical kettle equipped with an anchor agitator and baffle, was charged with approximately 27.8 L of deionized water and set to a defined temperature. The kettle was evacuated repeatedly to remove oxygen and the agitation speed was set to 125 revolutions per minute (rpm). About 50 g of the 30% solution of emulsifier as described above, containing 3M FLUORINERT ELECTRONIC FLUID FC-70 and about 15 g of the fluorinated polyether carboxylic acid emulsifier ($CF_3O(CF_2)_3OCHFCF_2C(O)ONH_4$) was added to the oxygen free kettle. Then 0.91 g of oxalic acid×2 $H_2O$ was added, followed by the non-telogenic fluorinated polyether. The kettle then was pressurized with tetrafluoroethylene (TFE) monomer to 1.5 MPa. In the first 45 minutes of the reaction, an aqueous solution of potassium permanganate (initiator) was pumped into the reactor.

A pressure drop indicated the start of the polymerization reaction. Between 5 to 10 kg of TFE were continuously fed to the polymerization such that the required polymerization pressure was maintained. After the desired amount of TFE had been fed, the polymerization reaction was stopped by shutting the monomer valve and releasing the pressure.

After polymerization of the PTFE, the PTFE latex comprised PTFE particles (i.e., primary particles) in an aqueous solution. The PTFE latex was deliberately coagulated and dried as follows. The PTFE latex (1000 mL) was diluted with deionized water (1000 mL) and coagulated by adding 418 mg of oxalic acid×2 $H_2O$. The coagulated PTFE was washed with 3 L deionized water and then dried at 175° C. for 12 hours to obtain the secondary particles PTFE (i.e., fine powder PTFE).

Test Methods

Solid Content: the quantity of primary PTFE particles obtained from the polymerization was determined according to DIN EN ISO 12086.

$D_{50}$: the particle size of the primary PTFE particle obtained from the polymerization was measured by dynamic light scattering with a particle size analyzer (Zetasizer 1000 HAS by Malvern Instruments Ltd., Worcestershire, UK) following the method as described in DIN EN ISO 13321.

Standard specific gravity (SSG): The procedure as described in ASTM 4895 and D792-08 was followed to assess the SSG of the secondary PTFE particles except that n-butylacetate was used as the liquid to determine gravity.

Pn: The polymerization number for the polymerization reaction was calculated according to the equation:

$$P_n = \frac{2(\text{moles polymerized } TFE)}{(\text{moles of initiator used})}$$

When calculating the moles of initiator used, it was assumed that the initiator was totally consumed during the polymerization process assuming the half-life of potassium permanganate is about $\tau_{1/2}$=6.1 min (17 bar (1.7 MPa) at 45° C.).

The quotient of the gross reaction rate ($v_{Br}$) and the volume of the reaction phase ($V_{rp}$) are calculated by division of the TFE consumption at the end of the polymerization (kg/hr) by the volume of water used [$m^3$]. The resulting quotient has the unit [kg/($m^3$ hr)].

Endothermic ratio (ER): The endothermic ratio was determined by a DSC-measurement (differential scanning calorimetry) on the secondary PTFE particles as described in U.S. Pat. No. 2002/0161149 (Kobayashi et al.).

Coagulum: The amount of coagulum unintentionally formed during the polymerization can be determined as follows: the coagulated material can be removed from the reaction vessel with an 80 μm filter, dried, and weighed using a balance.

Extrusion Pressure: The extrusion pressure at a reduction ratio of 100 (according to DIN EN ISO 12086) was measured on the secondary PTFE particles.

Comparative Example A (CE-A)

Process A was carried out about 30° C. except that no non-telogenic fluorinated polyether was used. Shown in Table 1 is the amount of initiator used, the total run time, and the quotient of the gross reaction rate ($v_{Br}$) and the volume of the reaction phase ($V_{rp}$). Also reported in Table 1 is the resulting solid content and $D_{50}$ of the polymer latex.

TABLE 1

| Ex. | Initiator [mmol] | Run time [min] | $v_{Br}/V_{rp}$* [kg/($m^3$ · hr)] | Solid content [%] | $D_{50}$ [nm] |
|---|---|---|---|---|---|
| CE-A | 0.08 | 128 | 22 | 8.4 | 159 |

*TFE uptake prior to terminating the polymerization. For a 40 L-kettle with 26.8 L of water, this corresponds to an uptake rate of <0.6 kg/h.

The polymerization in CE-A was prematurely stopped because of low TFE consumption, which indicates the formation of coagulum. However, as shown in Table 1, after 128 minutes of run time, $v_{Br}/V_{rp}$ was 22 [kg/($m^3$·hr)], and a low solid content was observed (8.4%), suggesting the presence of coagulum, which was slowing down the polymerization.

Comparative Example B (CE-B)

Process A was carried out 30° C., using 1.5 MPa of TFE to pressurize the kettle, 80 g of the fluorinated emulsifier, 0.08 mmol of initiator, and 100 mmol of perfluoroperhydrofluoren, a perfluorinated fluorocarbon ($C_{13}F_{22}$, available under the trade designation "FLUTEC PP11" by F2 Chemicals LTD., Lancashire, United Kingdom). Shown in Table 2 is the total run time, quotient of the gross reaction rate ($v_{Br}$) and the volume of the reaction phase ($V_{rp}$), and the resulting solid content and $D_{50}$ of the polymer latex.

Example CE-B was prematurely stopped for the same reasons as described in example CE-A.

Example 1

Process A was carried out at 30° C., using 1.5 MPa of TFE to pressurize the kettle, 0.08 mmol of initiator and 100 mmol of the non-telogenic fluorinated polyether, [$C_3F_7$—O—CF(—$CF_3$)—$CF_2$—O—CF(—$CF_3$)—]$_2$ (sold under the trade designation "HOSTINERT 216" by Hoechst AG, Frankfurt, Germany). Shown in Table 2 is the total run time, quotient of the gross reaction rate ($v_{Br}$) and the volume of the reaction phase ($V_{rp}$) and the resulting solid content and $D_{50}$ of the polymer latex. For Example 1 the extrusion pressure at reduction ratio of 100 was measured as 12.1 MPa.

TABLE 2

| Ex. | Nontelogenic Fluorinated Solvent | Run time [min] | $v_{Br}/V_{rp}$ [kg/($m^3$ · hr)] | Solid content [%] | $D_{50}$ [nm] | SSG [g/$cm^3$] |
|---|---|---|---|---|---|---|
| CE-B | Cyclic fluorocarbon | 60 | 33 | 8.2 | 157 | 2.145 |
| 1 | Polyether | 132 | 46 | 18.8 | 190 | 2.140 |

Example CE-B contained more coagulum than Example 1, even though the solid content was less than half that of example 1.

Comparative Example C (CE-C)

Process B was carried out at 45° C., with 1.5 MPa of TFE and without a non-telogenic fluorinated polyether. Shown in Table 3 are the amount of initiator used, the total run time, and the quotient of the gross reaction rate ($v_{Br}$) and the volume of the reaction phase ($V_{rp}$). Also reported in Table 3 is the resulting solid content, $D_{50}$, SSG, and $P_n$ of the polymer latex.

TABLE 3

| Ex. | Initiator [mmol] | Run time [min] | $v_{Br}/V_{rp}$ [kg/(m$^3$·hr)] | Solid content [%] | $D_{50}$ [nm] | SSG [g/cm$^3$] | $P_n$ $10^6$ |
|---|---|---|---|---|---|---|---|
| CE-C | 0.07 | 178 | 22 | 12.1 | 153 | 2.177 | 0.4 |

The polymerization was prematurely stopped because of low TFE consumption. However, as shown in Table 3, after 178 minutes of run time, $v_{br}/V_{rp}$ was 21.6 [kg/(m$^3$·hr)] and a low solid content was observed (12.1%), suggesting the presence of coagulum, which was slowing down the polymerization.

Examples 2 to 6

The impact of a variable amount of non-telogenic fluorinated polyether was investigated by following the method as described in Process B carried out at 45° C., using 1.7 MPa of TFE to pressurize the kettle, 0.07 mmol of initiator, and [C$_3$F$_7$OCF(CF$_3$)CF$_2$OCF(CF$_3$)—]$_2$ as the non-telogenic fluorinated polyether. Shown in Table 4 is the amount of non-telogenic fluorinated polyether used in each example. Also shown in Table 4 is the total run time, quotient of the gross reaction rate ($v_{Br}$) and the volume of the reaction phase ($V_{rp}$), and the resulting solid content, $D_{50}$, SSG, and $P_n$ of the polymer latex. The extrusion pressure at reduction ratio of 100 was measured as 15 MPa for Example 4 and 13.9 MPa for Example 6. The polymerizations were stopped when the TFE consumption dropped.

TABLE 4

| Ex. | Nontelogenic Fluorinated Polyether [mmol] | Run time [min] | $v_{Br}/V_{rp}$ [kg/ (m$^3$·hr)] | Solid content [%] | $D_{50}$ [nm] | SSG [g/ cm$^3$] | $P_n$ $10^6$ | ER |
|---|---|---|---|---|---|---|---|---|
| 2 | 222 | 140 | 58 | 17.9 | 201 | 2.146 | 1.9 | 0.02 |
| 3 | 166 | 139 | 54 | 18.1 | 201 | 2.146 | 1.8 | 0.09 |
| 4 | 83 | 151 | 47 | 19.1 | 205 | 2.146 | 1.9 | 0.09 |
| 5 | 55 | 144 | 50 | 18.9 | 208 | 2.147 | 2.1 | 0.08 |
| 6 | 28 | 180 | 47 | 17.3 | 203 | 2.148 | 1.4 | 0.05 |

Examples 7 and 8

Process B was carried out at 45° C., using 1.5 MPa of TFE to pressurize the kettle, 0.07 mmol of initiator, and 166 mmol of a non-telogenic fluorinated polyether. Example 7 used a perfluorinated polyether, [C$_3$F$_7$OCF(CF$_3$)CF$_2$OCF(CF$_3$)—]$_2$, while Example 8 used a partially fluorinated polyether, CF$_3$CF$_2$CF$_2$O[CF(CF$_3$)CF$_2$O]$_4$CFHCF$_3$ (sold under the trade designation "TFEE 5" by Anles Ltd., St. Petersburg, Russia). Shown in Table 5 is the non-telogenic fluorinated polyether used in each example. Also shown in Table 5 is the total run time, quotient of the gross reaction rate ($v_{Br}$) and the volume of the reaction phase ($V_{rp}$), and the resulting solid content, $D_{50}$, SSG, and Pn of the polymer latex.

TABLE 5

| Ex. | Nontelogenic Fluorinated Polyether | Run time [min] | $v_{Br}/V_{rp}$ [kg/(m$^3$·hr)] | Solid content [%] | $D_{50}$ [nm] | SSG [g/cm$^3$] | $P_n$ $10^6$ |
|---|---|---|---|---|---|---|---|
| 7 | Hostinert 216 | 133 | 68 | 20.3 | 205 | 2.149 | 2.1 |
| 8 | TFEE 5 | 135 | 65 | 20.2 | 204 | 2.150 | 2.0 |

As shown in Table 5, the partially fluorinated polyether and the perfluorinated polyether showed similar SSG, Pn, and solid content under similar run times.

Foreseeable modifications and alterations of this invention will be apparent to those skilled in the art without departing from the scope and spirit of this invention. This invention should not be restricted to the embodiments that are set forth in this application for illustrative purposes. Some specific embodiments are listed below for illustrative purposes:

1. A polymerizable composition for PTFE comprising:
    an amount of water;
    a tetrafluoroethylene monomer;
    an emulsifier;
    an initiator; and
    a fluorinated polyether
 wherein the PTFE has a standard specific gravity of less than 2.160 g/cm$^3$.

2. The polymerizable composition according to embodiment 1, wherein the fluorinated polyether is at least 0.1% by weight versus the amount of water.

3. The polymerizable composition according to any one of the previous embodiments, wherein the fluorinated polyether is selected from at least one of: CHF$_2$CF$_2$CF$_2$OCF(CF$_3$)CF$_2$OCFHCF$_3$, CHF$_2$CF$_2$CF$_2$OCF(CF$_3$)CF(CF$_3$)OCF$_2$CF$_2$CHF$_2$, CF$_3$CF$_2$CF$_2$OCF(CF$_3$)CF(CF$_3$)OCF$_2$CF$_2$CF$_3$, CF$_3$(OCF(CF$_3$)CF$_2$)$_n$(OCF2)$_m$OCF$_3$ wherein n and m are independently, within the range of 1 to 5, CF$_3$CF$_2$CF$_2$O[CF(CF$_3$)CF$_2$O]$_n$CFXCF$_3$ wherein X is selected from H, F, or CF$_3$ and n is within the range of 2 to 8, [C$_3$F$_7$O[CF(CF$_3$)CF$_2$O]$_n$CF(CF$_3$)—]$_2$ wherein n is within the range of 1 to 3, [C$_3$F$_7$OCF(CF$_3$)CF$_2$OCF(CF$_3$)CF$_2$OCF(CF$_3$)]$_2$, [C$_3$F$_7$OCF(CF$_3$)CF$_2$OCFHCF$_2$—]$_2$, and including all isomers and combinations thereof.

4. The polymerizable composition according to any one of the previous embodiments, wherein the fluorinated polyether has a boiling point of between 50 to 300° C.

5. The polymerizable composition according to any one of the previous embodiments, wherein the fluorinated polyether has a molecular weight of less than 2000 grams/mole.

6. The polymerizable composition according to any one of the previous embodiments, further comprising a fluorinated comonomer.

7. The polymerizable composition according to embodiment 6, wherein the fluorinated comonomer is selected from at least one of: hexafluoropropylene, vinylidene fluoride, chlorotrifluoroethylene, perfluoro(methyl vinyl ether), perfluoro(ethyl vinyl ether), perfluoro(propyl vinyl ether), perfluoro-2-propoxypropyl vinyl ether, perfluoro-2-methoxyethylvinyl ether, perfluoro-3-methoxy-1-propylvinyl ether, and combinations thereof.

8. The polymerizable composition according to any one of the previous embodiments, wherein the initiator is a permanganate or a persulfate.

9. The polymerizable composition according to any one of the previous embodiments, wherein the emulsifier is selected from a perfluorinated alkanoic acid, a perfluorinated or partially fluorinated acid comprising one or more ether linkages, or their salts.

10. The polymerizable composition according to any one of the previous embodiments, wherein the emulsifier is a partially fluorinated emulsifier and the non-telogenic fluorinated polyether is partially fluorinated.

11. The polymerizable composition according to any one of the previous embodiments, further comprising a seed particle.

12. A PTFE made from the polymerizable composition according to any one of embodiments 1-11, wherein the particle size of the PTFE in the aqueous emulsion is greater than 150 nm.

13. The PTFE according to embodiment 12, wherein the PTFE is essentially free of alkane hydrocarbons having between 15 to 60 carbon atoms.

14. A process for making PTFE comprising: polymerizing a tetrafluoroethylene monomer in an aqueous medium comprising an emulsifier and an initiator in a reaction vessel, contacting the aqueous medium with a fluorinated polyether to form a PTFE emulsion, and coagulating and drying the PTFE coagulation, wherein the resulting PTFE has a standard specific gravity of less than 2.160 g/cm$^3$.

15. The process according to embodiment 14, wherein the weight ratio of the fluorinated polyether to emulsifier is greater than 1:1.

16. The process according to any one of embodiments 14-15, wherein the PTFE of the PTFE emulsion has a particle size greater than 150 nm.

17. The process according to any one of embodiments 14-16, wherein the fluorinated polyether is added separately from the emulsifier.

18. The process according to any one of embodiments 14-17, wherein the fluorinated polyether is selected from at least one of: $CHF_2CF_2CF_2OCF(CF_3)CF_2OCFHCF_3$, $CHF_2CF_2CF_2OCF(CF_3)CF(CF_3)OCF_2CF_2CHF_2$, $CF_3CF_2CF_2OCF(CF_3)CF(CF_3)OCF_2CF_2CF_3$, $CF_3(OCF(CF_3)CF_2)_n(OCF2)_mOCF_3$ wherein n and m are independently, within the range of 1 to 5, $CF_3CF_2CF_2O[CF(CF_3)CF_2O]_nCFXCF_3$ wherein X is selected from H, F, or $CF_3$ and n is within the range of 2 to 8, $[C_3F_7O[CF(CF_3)CF_2O]_nCF(CF_3)—]_2$ wherein n is within the range of 1 to 3, $[C_3F_7OCF(CF_3)CF_2OCF(CF_3)]_2$, $[C_3F_7OCF(CF_3)CF_2OCFHCF_2—]_2$, and including all isomers and combinations thereof.

19. The process according to any one of embodiments 14-18, further comprising polymerizing the tetrafluoroethylene monomer with a fluorinated comonomer selected from at least one of: hexafluoropropylene, vinylidene fluoride, chlorotrifluoroethylene, perfluoro(methyl vinyl ether), perfluoro(ethyl vinyl ether), perfluoro(propyl vinyl ether), perfluoro-2-propoxypropyl vinyl ether, perfluoro-2-methoxy-ethylvinyl ether, perfluoro-3-methoxy-1-propylvinyl ether, and combinations thereof.

20. The process according to any one of embodiments 14-19, wherein the reaction vessel is a vertical kettle.

21. The process according to any one of embodiments 14-20, further comprising seeding the polymerization with a seed particle.

22. The process according to any one of embodiments 14-21, wherein the polymerization is conducted at a temperature of at most 80° C.

23. The process according to any one of embodiments 14-22, wherein the PTFE has a $P_n$ of at least 500,000.

24. A PTFE obtainable by the process according to any one of embodiments 14-23.

25. An article made from the PTFE according to any one of embodiments 12-13 or 24, or 26 to 37 wherein the article is a garment, fiber, or sheet.

26. A composition comprising
a non-telogenic fluorinated polyether and a polytetrafluoroethene (PTFE) polymer,
wherein the PTFE has a standard specific gravity of less than 2.160 g/cm$^3$.

27. The composition according to embodiment 26 wherein the composition does not comprise hydrocarbons of the formula CnH2n+2 wherein n is selected from 20 to 40.

28. The composition according to any one of embodiments 26 or 27, wherein the PTFE polymer is a core shell polymer having at least one shell that has a lower molecular weight than the core.

29. The composition according to any one of embodiments 26 to 28, wherein the non-telogenic fluorinated polyether is selected from at least one of: $CHF_2CF_2CF_2OCF(CF_3)CF_2OCFHCF_3$, $CHF_2CF_2CF_2OCF(CF_3)CF(CF_3)OCF_2CF_2CHF_2$, $CF_3CF_2CF_2OCF(CF_3)CF(CF_3)OCF_2CF_2CF_3$, $CF_3(OCF(CF_3)CF_2)_n(OCF2)_mOCF_3$ wherein n and m are independently, within the range of 1 to 5, $CF_3CF_2CF_2O[CF(CF_3)CF_2O]_nCFXCF_3$ wherein X is selected from H, F, or $CF_3$ and n is within the range of 2 to 8, $[C_3F_7O[CF(CF_3)CF_2O]_nCF(CF_3)—]_2$ wherein n is within the range of 1 to 3, $[C_3F_7OCF(CF_3)CF_2OCF(CF_3)CF_2OCF(CF_3)]_2$, $[C_3F_7OCF(CF_3)CF_2OCFHCF_2—]_2$, and including all isomers and combinations thereof.

30. The composition according to any one of the previous embodiments, wherein fluorinated polyether has a boiling point of between 50 to 300° C.

31. The composition according to any one of the preceding embodiments, wherein fluorinated polyether has a molecular weight of less than 2000 grams/mole.

32. The compositions according to any one of the preceding embodiments wherein the PTFE polymer is a comonomer.

33. The composition according to embodiment 6, wherein the comonomer is selected from at least one of: hexafluoropropylene, vinylidene fluoride, chlorotrifluoroethylene, perfluoro(methyl vinyl ether), perfluoro(ethyl vinyl ether), perfluoro(propyl vinyl ether), perfluoro-2-propoxypropyl vinyl ether, perfluoro-2-methoxy-ethylvinyl ether, perfluoro-3-methoxy-1-propylvinyl ether, and combinations thereof.

34. The composition according to any one of the previous embodiments, further comprising an emulsifier wherein the emulsifier is selected from a perfluorinated alkanoic acid, a perfluorinated or partially fluorinated acid comprising one or more ether linkages, or their salts.

35. The composition according to embodiment 34, wherein the emulsifier is a partially fluorinated emulsifier.

36. The composition according to any one of embodiments 26 to 35 wherein the composition is in the form of particles and where the particles have an average particle size (number average) of greater than 150 μm or greater than 150 μm and less than 3,000 μm.

37. The composition according to any one of embodiments 26 to 35 wherein the composition is an aqueous emulsion and wherein the PTFE has an average particle size (volume average) of greater than 150 nm to less than 500 nm.

38. The compositions according to any one of embodiments 26 to 35 having an elongation at break of at least 700%.

The invention claimed is:
1. A polymerizable composition for preparing a PTFE latex, the polymerizable composition comprising:
    an amount of water;
    a tetrafluoroethylene monomer;
    an emulsifier according to formula VI

$[R_f—O-L-COO^-]_xX_i^+$ (VI)

wherein L represents a linear partially or fully fluorinated alkylene group or an aliphatic hydrocarbon group, $R_f$ represents a linear partially or fully fluorinated aliphatic group or a linear partially or fully fluorinated group interrupted with one or more oxygen atoms, $X_i^+$ represents a cation having the valence i and i is 1, 2 and 3;
an initiator; and
0.1 to 0.75 wt % of a fluorinated polyether based on the amount of water, wherein the fluorinated polyether is at least one of the following:

$$R_f-(OCF_2)_x-(OCF_2CF_2)_y-(OCF(CF_3)-CF_2)_z-(OCF(CF_3))_a-Q \quad (II)$$

wherein $R_f$ is selected from perfluoroalkyl groups having from 1 to 10 carbon atoms; Q is selected from $R_f$ or $R'_f-(OCF_2)_x-(OCF_2CF_2)_y-(OCF(CF_3)-CF_2)_z-(OCF(CF_3))_a$ wherein $R'_f$ may be selected from a perfluorinated alkyl group having 1 to 10 carbon atoms, $R'_f$ may be the same or different than $R_f$; and wherein each x, y, z, and a is independently selected from 0 to 10, with the proviso that the sum of x+y+z+a is at least 1;

$$R_f-(OC_3F_6)_n-O-CHFCF_2- \quad (III)$$

wherein $R_f$ is selected from a perfluorinated alkyl group having from 1 to 4 carbon atoms, and n is from 1 to 10; and
(iii) a fluorinated polyether which is a derivative of hexafluoropropylene oxide having at least 1 repeating unit of $-[(CF_3)CFCF_2O]-$;
wherein, upon polymerization of the polymerizable composition, the PTFE latex is formed such that the PTFE latex has an average particle size of at least 150 nm, and upon coagulation of the PTFE latex to form a coagulated PTFE, the coagulated PTFE has a standard specific gravity of less than 2.160 g/cm³, wherein the polymerizable composition comprises more moles of the fluorinated polyether than moles of the emulsifier, and wherein the PTFE latex contains a homopolymer of tetrafluoroethylene.

2. The polymerizable composition according to claim 1, wherein the partially fluorinated polyether has a boiling point of between 50 to 300° C.

3. The polymerizable composition according to claim 1, wherein the fluorinated polyether has a molecular weight of less than 2000 grams/mole.

4. The polymerizable composition according to claim 1, wherein the emulsifier is selected from a perfluorinated alkanoic acid, a perfluorinated or partially fluorinated acid comprising one or more ether linkages, or their salts.

5. The polymerizable composition according to claim 1, further comprising a seed particle.

6. The polymerizable composition according to claim 1, wherein the coagulated PTFE is essentially free of alkane hydrocarbons having between 15 to 60 carbon atoms.

7. The polymerizable composition according to claim 1, comprising at least 0.5% by weight of the fluorinated polyether versus the amount of water.

8. The polymerizable composition according to claim 1, comprising less than 5000 ppm of the emulsifier based on the amount of water.

9. The polymerizable composition according to claim 1, wherein the emulsifier is not added simultaneously with the fluorinated polyether.

10. The polymerizable composition according to claim 1, wherein the PTFE latex has an average particle size of at most 350 nm.

11. The polymerizable composition according to claim 1, wherein the fluorinated polyether comprises at least one of: $CF_3CF_2CF_2O[CF(CF_3)CF_2O]_nCFHCF_3$ wherein n is within the range of 1 to 3.

12. The polymerizable composition according to claim 1, wherein the fluorinated polyether has a boiling point of between 100 to 300° C.

13. The polymerizable composition according to claim 1, wherein the fluorinated polyether is selected from at least one of:
$CHF_2CF_2CF_2OCF(CF_3)CF_2OCFHCF_3$,
$CHF_2CF_2CF_2OCF(CF_3)CF(CF_3)OCF_2CF_2CHF_2$,
$CF_3CF_2CF_2OCF(CF_3)CF(CF_3)OCF_2CF_2CF_3$, $CF_3(OCF(CF_3)CF_2)_n(OCF_2)_mOCF_3$ wherein n and m are independently, within the range of 1 to 5, $CF_3CF_2CF_2O[CF(CF_3)CF_2O]_nCFXCF_3$ wherein X is selected from H, F, or $CF_3$ and n is within the range of 2 to 8,
$[C_3F_7O[CF(CF_3)CF_2O]_nCF(CF_3)-]_2$ wherein n is within the range of 1 to 3,
$[C_3F_7OCF(CF_3)CF_2OCF(CF_3)CF_2OCF(CF_3)]_2$,
$[C_3F_7OCF(CF_3)CF_2OCFHCF_2-]_2$, and including all isomers and combinations thereof.

14. An article made from the PTFE coagulate according to claim 1, wherein the article is a garment, fiber, or sheet.

15. A process for making PTFE comprising: polymerizing a tetrafluoroethylene monomer in an aqueous medium comprising water, an emulsifier, and an initiator in a reaction vessel, contacting the aqueous medium with 0.1 to 0.75 wt % of a fluorinated polyether based on the amount of water, wherein the polymerizing forms a PTFE latex, and coagulating and drying the PTFE latex to form a PTFE coagulate, wherein the PTFE latex has an average particle size of at least 150 nm and the PTFE coagulate has a standard specific gravity of less than 2.160 g/cm³ wherein the aqueous medium comprises more moles of the fluorinated polyether than moles of the emulsifier and wherein the PTFE latex contains a homopolymer of tetrafluoroethylene, wherein the emulsifier is according to formula VI $$[R_f-O-L-COO^-]_iX_i^+ \quad (VI)$$

wherein L represents a linear partially or fully fluorinated alkylene group or an aliphatic hydrocarbon group, $R_f$ represents a linear partially or fully fluorinated aliphatic group or a linear partially or fully fluorinated group interrupted with one or more oxygen atoms, $X_i^+$ represents a cation having the valence i and i is 1, 2 and 3; and the fluorinated polyether is at least one of the following:

$$R_f-(OCF_2)_x-(OCF_2CF_2)_y-(OCF(CF_3)-CF_2)_z-(OCF(CF_3))_a-Q \quad (II)$$

wherein $R_f$ is selected from perfluoroalkyl groups having from 1 to 10 carbon atoms; Q is selected from $R_f$ or $R'_f-(OCF_2)_x-(OCF_2CF_2)_y-(OCF(CF_3)-CF_2)_z-(OCF(CF_3))_a$ wherein $R'_f$ may be selected from a perfluorinated alkyl group having 1 to 10 carbon atoms, $R'_f$ may be the same or different than $R_f$; and wherein each x, y, z, and a is independently selected from 0 to 10, with the proviso that the sum of x+y+z+a is at least 1;

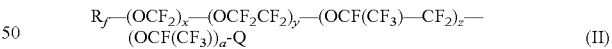

$$R_f-(OC_3F_6)_n-O-CHFCF_2- \quad (III)$$

wherein $R_f$ is selected from a perfluorinated alkyl group having from 1 to 4 carbon atoms, and n is from 1 to 10; and
(iii) a fluorinated polyether which is a derivative of hexafluoropropylene oxide having at least 1 repeating unit of $-[(CF_3)CFCF_2O]-$.

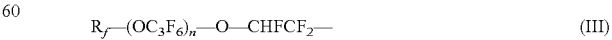

16. The process according to claim 15, wherein a weight ratio of the partially fluorinated polyether to emulsifier is greater than 1:1.

17. The process according to claim 15, wherein the fluorinated polyether is added separately from the emulsifier.

18. The process according to claim 15, wherein the polymerizing is conducted at a temperature of at most 80° C.

19. The process according to claim 15, wherein the PTFE latex has a $P_n$ of at least 500,000.

20. A PTFE coagulate made by the process according to claim 15.

* * * * *

UNITED STATES PATENT AND TRADEMARK OFFICE
CERTIFICATE OF CORRECTION

PATENT NO. : 11,072,671 B2
APPLICATION NO. : 13/642583
DATED : July 27, 2021
INVENTOR(S) : Frey et al.

Page 1 of 1

It is certified that error appears in the above-identified patent and that said Letters Patent is hereby corrected as shown below:

In the Claims

Column 19
Line 42, In Claim 2, delete "partially fluorinated polyether" and insert -- fluorinated polyether --, therefor.

Column 21
Line 2, In Claim 16, delete "partially fluorinated polyether" and insert -- fluorinated polyether --, therefor.

Signed and Sealed this
Twenty-sixth Day of April, 2022

Katherine Kelly Vidal
*Director of the United States Patent and Trademark Office*